US012767329B2

(12) United States Patent
Rezvani

(10) Patent No.: US 12,767,329 B2
(45) Date of Patent: Oct. 20, 2026

(54) DRONE WIRELESS COMMUNICATION DIAGNOSIS AND CORRECTION

(71) Applicant: Alarm.com Incorporated, Tysons, VA (US)

(72) Inventor: Babak Rezvani, St Petersburg, FL (US)

(73) Assignee: Alarm.com Incorporated, Tysons, VA (US)

(*) Notice: Subject to any disclaimer, the term of this patent is extended or adjusted under 35 U.S.C. 154(b) by 141 days.

(21) Appl. No.: 18/788,627

(22) Filed: Jul. 30, 2024

(65) Prior Publication Data

US 2024/0397350 A1 Nov. 28, 2024

Related U.S. Application Data

(63) Continuation of application No. 17/699,432, filed on Mar. 21, 2022, now Pat. No. 12,077,294, which is a (Continued)

(51) Int. Cl.
*B64C 39/02* (2023.01)
*H04W 24/04* (2009.01)
(Continued)

(52) U.S. Cl.
CPC ........... *B64C 39/024* (2013.01); *H04W 24/04* (2013.01); *B64U 2101/00* (2023.01); *B64U 2101/21* (2023.01); *B64U 2201/20* (2023.01)

(58) Field of Classification Search
CPC .............. B64C 39/024; B64U 2101/00; B64U 2101/21; B64U 2201/20; H04W 24/04; H04W 24/08
See application file for complete search history.

(56) References Cited

U.S. PATENT DOCUMENTS 7,823,199 B1 10/2010 Rathi et al.
8,972,820 B2 3/2015 Hassan et al.
(Continued)

FOREIGN PATENT DOCUMENTS

WO WO 2015175057 11/2015
WO WO 2016180652 11/2016
WO WO 2017205314 7/2017

*Primary Examiner* — David P. Merlino
(74) *Attorney, Agent, or Firm* — Fish & Richardson P.C.

(57) ABSTRACT

Methods, systems, and apparatus, including computer programs encoded on a storage device, for using a drone to identify a wireless network problem and initiate performance of one or more operations or actions that address the wireless network problem, the drone comprising a processor and a storage device, the storage device storing instructions that, when executed by the processor, cause the processor to perform operations comprising receiving, by the drone, an instruction to analyze a wireless network of a property, responsive to the instruction to analyze the wireless network, traveling, by the drone, to one or more zones of the property, determining, by the drone and based on an analysis of one or more characteristics of the wireless network, that a wireless network problem exists, and based on the determination that the wireless network problem exists, performing, by the drone, one or more operations directed to addressing the wireless network problem.

18 Claims, 6 Drawing Sheets

Related U.S. Application Data continuation of application No. 15/932,357, filed on Feb. 16, 2018, now Pat. No. 11,279,480.

(60) Provisional application No. 62/459,860, filed on Feb. 16, 2017.

(51) Int. Cl.
*B64U 101/00* (2023.01)
*B64U 101/21* (2023.01)

(56) References Cited

U.S. PATENT DOCUMENTS

| | | | | |
|---|---|---|---|---|
| 9,363,690 | B1 | 6/2016 | Singh et al. | |
| 9,456,361 | B1 | 9/2016 | Levy et al. | |
| 9,692,498 | B2 | 6/2017 | Fan et al. | |
| 9,781,609 | B1 | 10/2017 | Kurtz et al. | |
| 9,948,380 | B1 | 4/2018 | Vos et al. | |
| 11,606,725 | B2 * | 3/2023 | Yoon | H04W 28/20 |
| 2006/0246887 | A1 | 11/2006 | Barclay et al. | |
| 2011/0300896 | A1 * | 12/2011 | Wang | H04W 76/18 455/524 |
| 2014/0277854 | A1 | 9/2014 | Jones et al. | |
| 2015/0266577 | A1 | 9/2015 | Jones et al. | |
| 2015/0304869 | A1 | 10/2015 | Johnson et al. | |
| 2015/0312774 | A1 | 10/2015 | Lau | |
| 2016/0028471 | A1 | 1/2016 | Boss et al. | |
| 2016/0105814 | A1 * | 4/2016 | Hurst | H04L 67/025 370/252 |
| 2016/0150427 | A1 | 5/2016 | Ramanath | |
| 2016/0309337 | A1 | 10/2016 | Priest et al. | |
| 2016/0323760 | A1 | 11/2016 | Zhang et al. | |
| 2016/0373944 | A1 | 12/2016 | Jain et al. | |
| 2016/0373963 | A1 | 12/2016 | Chechani | |
| 2017/0013478 | A1 | 1/2017 | Singh et al. | |
| 2017/0048789 | A1 | 2/2017 | Tan et al. | |
| 2017/0078896 | A1 | 3/2017 | Kephart, Jr. et al. | |
| 2017/0086112 | A1 | 3/2017 | Xue et al. | |
| 2017/0111102 | A1 | 4/2017 | Fan et al. | |
| 2017/0303138 | A1 | 10/2017 | Barmettler et al. | |
| 2017/0311127 | A1 | 10/2017 | Murphy et al. | |
| 2017/0339584 | A1 | 11/2017 | Ketonen et al. | |
| 2018/0086483 | A1 * | 3/2018 | Priest | B64U 70/50 |
| 2018/0151045 | A1 | 5/2018 | Kim et al. | |
| 2019/0312633 | A1 | 10/2019 | Nilsson et al. | |
| 2020/0128359 | A1 | 4/2020 | Patil et al. | |

* cited by examiner

DRONE WIRELESS COMMUNICATION DIAGNOSIS AND CORRECTION

CROSS-REFERENCE TO RELATED APPLICATIONS

This application is a continuation of U.S. application Ser. No. 17/699,432, filed Mar. 31, 2022, which is a continuation of U.S. application Ser. No. 15/932,357, filed Feb. 16, 2018, which claims the benefit of the U.S. Provisional Patent Application No. 62/459,860 filed Feb. 16, 2017. All of these prior applications are incorporated by reference in their entirety.

TECHNICAL FIELD

This specification relates to wireless network troubleshooting.

BACKGROUND

The use of wireless networks such as a Wi-Fi network is becoming increasingly more prevalent. At many properties, the primary way to connect to the Internet is a wireless network. Use of such wireless networks enables a user of a user device connected to the wireless network and to move around the property, freely, while still maintaining a connection to the wireless network. However, reliance on a wireless network can be problematic if the user is in a location that is associated with weak wireless network, a dead-zone, or the like.

SUMMARY

The subject matter of the present disclosure is related to techniques for using one or more drones to diagnose wireless signal reach and interference issues, among other wireless communication issues. One or more drones may be configured to navigate to various locations within a property to better diagnose wireless communication issues throughout the property.

In some instances, the one or more drones may detect that a problem in a wireless communication network. For example, the one or more drones may determine that the wireless signal strength in one or more zones of a property does not satisfy a predetermined signal strength threshold. The one or more drones can perform one or more actions to correct the detected problem in the wireless communication network. For example, the one or more drones may be able to move wireless routing components around the property to provide users with the best wireless signal strength and communication experience available at the location where the users desire to connect to wireless networks in the property. Alternatively, or in addition, the one or more drones may be equipped with a light, laser, or other pointing instrument that the one or more drones can use to point to a location where a wireless routing component should be positioned to provide users with the best signal strength and communication experience. Alternatively, or in addition, the one or more drones may generate a wireless network status report that is transmitted to a user who can take actions to correct the detected problem. Alternatively, or in addition, the one or more drones may be equipped with a wireless routing components (e.g., a repeater) that can be used to temporarily boost wireless signal strength in the vicinity of the drones.

For purposes of this specification, detection of a wireless network problem, includes the detection of any one or more characteristics of a wireless network that indicate less than optimal wireless network performance. Examples of one or more characteristics that can be detected as indicative of a wireless network problem include lack of wireless network connection (or lack of ability to connect to a wireless network connection), wireless network signal strength below a predetermined threshold, a number of user devices on a network exceeding a predetermined threshold, amount of bandwidth used by a user device exceeding a predetermined threshold, amount of available bandwidth on a particular spectrum of a wireless network falling below a predetermined threshold, or any combination thereof. However, wireless network problems may be detected based on the identification of yet other characteristics of a wireless network that are indicative of less than optimal wireless network performance.

According to one innovative aspect of the present disclosure, a drone is disclosed that is configured to identify a wireless network problem and initiate performance of one or more operations or actions that address the wireless network problem, the drone comprising one or more processors and one or more storage devices, the one or more storage devices storing instructions that, when executed by the one or more processors, cause the one or more processors to perform operations comprising: receiving, by the drone, an instruction to analyze a wireless network of a property, in response to the instruction to analyze the wireless network of the property, traveling, by the drone, to one or more zones of the property, determining, by the drone and based on an analysis of one or more characteristics of the wireless network, that a wireless network problem exists, and based on the determination that the wireless network problem exists, performing, by the drone, one or more operations directed to addressing the wireless network problem.

Other aspects include corresponding methods, systems, and computer programs to perform actions of methods defined by instructions encoded on computer storage devices.

These and other versions may optionally include one or more of the following features. For instance, in some implementations, receiving, by the drone, an instruction to analyze a wireless network of the property includes receiving, by the drone, an instruction to analyze the wireless network in one or more zones of the property from a user device of an occupant of the property.

In some implementations, traveling, by the drone, to one or more zones of the property includes traveling, by the drone, from a charging station that is located at a first zone of the property to a second zone of the property that corresponds to the one or more zones.

In some implementations, receiving, by the drone, an instruction to analyze a wireless network of the property includes receiving, by the drone, an instruction to analyze a wireless network in one or more zones of the property from a user device of a technician that is diagnosing the wireless network of the property.

In some implementations, traveling, by the drone, to one or more zones of the property includes traveling, by the drone, from a third zone that is remote from the property to a fourth zone that corresponds to the one or more zones.

In some implementations, receiving, by the drone, an instruction to analyze a wireless network of a property includes receiving, by the drone, an instruction to perform a wireless network diagnostic for one or more zones of the property from a monitoring system control unit that is configured to monitor sensor data generated by one or more sensors at the property, wherein the monitoring system control unit provides the instruction to the drone responsive to a determination that the monitoring system control unit cannot communicate with a sensor that is located in a particular zone of the property.

In some implementations, determining, by the drone and based on an analysis of one or more characteristics of the wireless network, that a wireless network problem exists includes determining, by the drone, whether connectivity to the wireless network can be established in the one or more zones, and in response to a determination, by the drone, that connectivity to the wireless network cannot be established in at least one zone of the one or more zones, determining, by the drone, that a wireless network problem exists.

In some implementations, determining, by the drone and based on an analysis of one or more characteristics of the wireless network, that a wireless network problem exists includes determining, by the drone, whether an upload speed of the wireless network in at least one of the one or more zones satisfies a predetermined threshold, and in response to a determination, by the drone, that the upload speed of the wireless network in at least one of the one or more zones satisfies a predetermined threshold, determining, by the drone, that a wireless network problem exists.

In some implementations, determining, by the drone and based on an analysis of one or more characteristics of the wireless network, that a wireless network problem exists includes determining, by the drone, whether a download speed of the wireless network satisfies one or more predetermined thresholds, and in response to a determination, by the drone, that the download speed of the wireless network in at least one of the one or more zones satisfies a predetermined threshold, determining, by the drone, that a wireless network problem exists.

In some implementations, determining, by the drone and based on an analysis of one or more characteristics of the wireless network, that a wireless network problem exists includes determining, by the drone, whether a number of packet retries satisfies a predetermined threshold, and in response to a determination, by the drone, that the number of packet retries in at least one of the one or more zones satisfies a predetermined threshold, determining, by the drone, that a wireless network problem exists.

In some implementations, determining, by the drone and based on an analysis of one or more characteristics of the wireless network, that a wireless network problem exists includes identifying, by the drone, each of devices connected to the wireless network, determining, by the drone and for each device connected to the wireless network, whether the bandwidth used by the device satisfies a predetermined threshold for bandwidth usage by a single device, and in response to a determination, by the drone, that the bandwidth used by one or more devices satisfies a predetermined threshold for bandwidth usage by a single device, determining, by the drone, that a wireless network problem exists.

In some implementations, determining, by the drone and based on an analysis of one or more characteristics of the wireless network, that a wireless network problem exists includes analyzing wireless network signal strength to determine whether the wireless network signal strength satisfies a predetermined wireless network signal strength, and in response to a determination, by the drone, that the wireless network strength satisfies a predetermined wireless network signal strength, determining, by the drone, that a wireless network problem exists.

In some implementations, determining, by the drone and based on an analysis of one or more characteristics of the wireless network, that a wireless network problem exists includes obtaining, by the drone and using a spectrum analyzer, data describing the level of saturation associated with at least a portion of the wireless spectrum for a portion of the wireless network in one or more of the zones, determining a level of saturation of the wireless spectrum for a portion of the wireless network in the one or more zones, determining whether the level of saturation of the wireless spectrum for a portion of the wireless network in the one or more zones satisfies a predetermined threshold, and in response to a determination that the level of saturation of the wireless spectrum for a portion of the wireless network in the one or more zones satisfies a predetermined threshold, determining, by the drone, that a wireless network problem exists.

In some implementations, performing, by the drone, one or more operations directed to addressing the wireless network problem wireless network problem includes determining, by the drone, a location for placement of a wireless repeater or wireless router that would address the existing wireless network problem, generating, by the drone, a message that includes data identifying the determined location for placement of the wireless repeater or wireless router that address the existing wireless network problem, and providing, by the drone, the message that includes data identifying the determined location for placement of the wireless repeater or wireless router that would address the wireless network problem to a user device.

In some implementations, performing, by the drone, one or more operations directed to addressing the wireless network problem wireless network problem includes determining, by the drone, a location for placement of a wireless repeater or wireless router that would address the existing wireless network problem, and outputting, by the drone, a light or a laser that illuminates the determined location.

In some implementations, performing, by the drone, one or more operations directed to addressing the wireless network problem wireless network problem includes determining, by the drone, a location for placement of a wireless repeater or wireless router that would address the existing wireless network problem, obtaining, by the drone, a battery-powered repeater, and positioning, by the drone, the battery-powered repeater at the determined location.

In some implementations, performing, by the drone, one or more operations directed to addressing the wireless network problem wireless network problem includes providing, by the drone, one or more instructions to a wireless repeater or a wireless router to adjust one or more wireless network parameters associated with the wireless network.

In some implementations, performing, by the drone, one or more operations that initiate performance of one or more other operations or actions that address the existing wireless network problem includes (i) providing, by the drone, a message that includes data identifying a determined location for placement of a wireless repeater or wireless router that would address the wireless network problem to a user device, (ii) outputting, by the drone, a light or a laser that illuminates a determined location for placement of a wireless repeater or wireless router that would address the wireless network problem, (iii) positioning, by the drone, a battery-powered wireless repeater at a determined location for placement of the battery-powered wireless repeater that would address the wireless network problem, or (iv) providing, by the drone, one or more instructions to a wireless repeater or a wireless router to adjust one or more wireless network parameters associated with the wireless network.

The monitoring system described by the present disclosure provides multiple advantages over existing systems. For example, the present disclosure enables a property owner or occupant to use a drone to (i) evaluate the status of a wireless network at the property and (ii) take one or more operations to improve the performance of the wireless network if one or more wireless network problems are detected. In addition, the disclosure also enables a wireless network technician to use a drone to evaluate and correct wireless network problems from remote location. For example, the wireless network technician can deploy a drone to a property location but remain at a remote location from the property and monitor the readings of drone sensors and evaluate recommendations triggered by the drone based on the drone's evaluation of the wireless network.

In addition, the present disclosure provides a monitoring system that can heal wireless network problems that the monitoring system detects due to lack of communication with one or more components of the monitoring system such as a camera or a sensors. When the monitoring system determines that the monitoring system can no longer detect, or communicate with, a camera, sensor, or other monitoring system component, the monitoring system can deploy a drone to evaluate the wireless network and correct any wireless network problems that are detected. This provides the monitoring system with a mechanism for automatic wireless network maintenance which increases the performance of the monitoring system.

These and other advantages are apparent from the following the written description, the drawings, and the claims.

DETAILED DESCRIPTION

Figure 1:
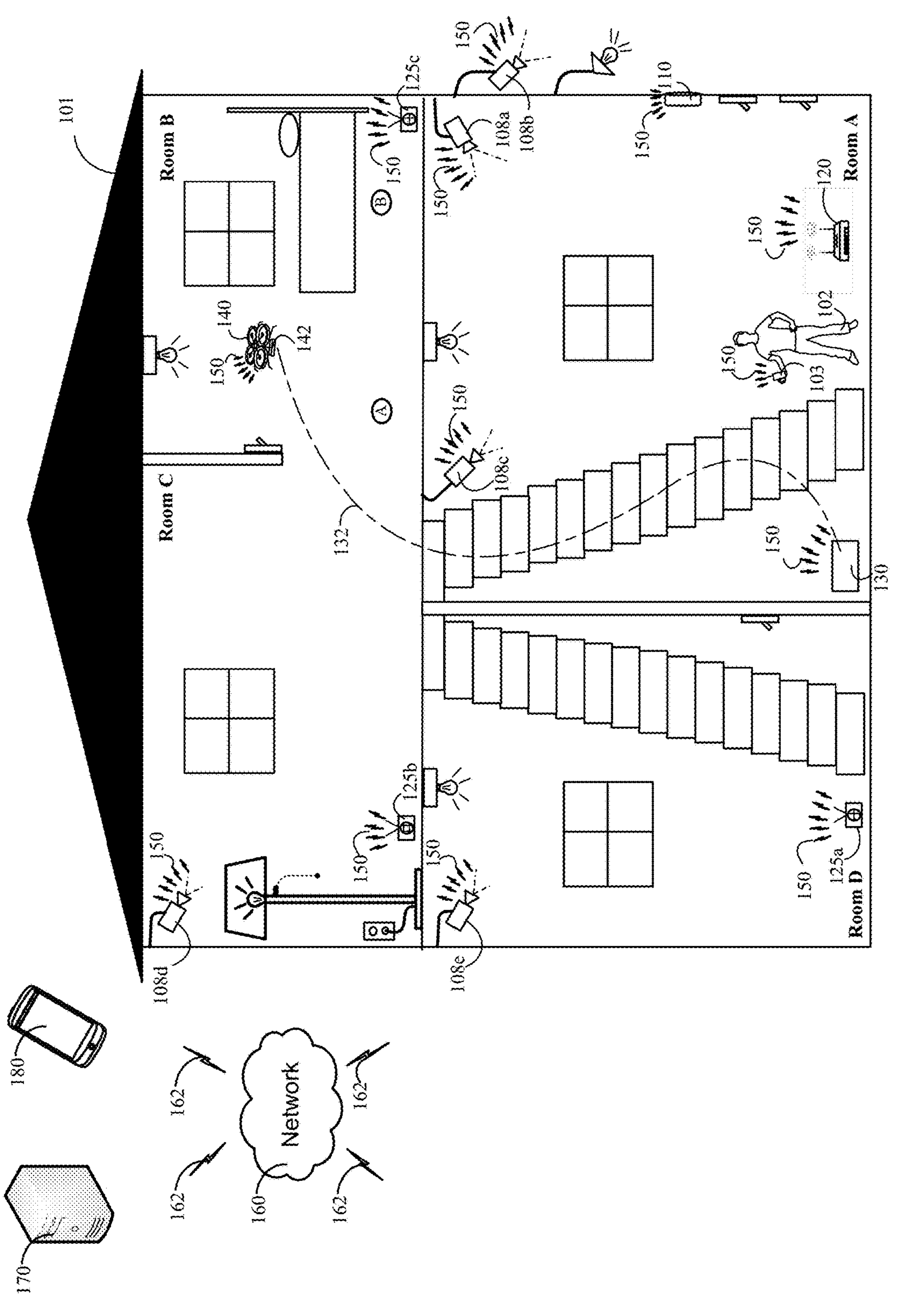
FIG. 1 is a contextual diagram of an example of a system for deploying a drone to diagnose a wireless network.

FIG. 1 is a contextual diagram of an example of a system 100 for deploying a drone 140 to diagnose a wireless network 150. The system 100 includes at least a wireless router 120, a drone 140, and a wireless network 150 produced by the wireless router 120. Though the example of system 100 includes only one drone, the present disclosure need not be so limited. As, other implementations that use multiple drones that perform the same, or similar, actions in the same, or different, zones of property 101 may also fall within the scope of the present disclosure.

The system 100 may also include a user device 103, one or more cameras **108*a*, 108*b*, 108*c*, 108*d*, 108*e*, a monitoring system control unit 110, one or more wireless network repeaters 125*a*, 125*b*, 125*c*, a wireless charging station 130, network 160, one or more communications links 162, a monitoring application server 170, and a remote client device 180. The wirelessly charging station 130 includes charging stations that can charge a battery of a drone 140 wirelessly without requiring the drone 140 to make physical contact with the charging station. Alternatively, or in addition, the wireless charging station 130 can also charge a battery of a drone 140 through physical contacts of a drone 140 when the drone 140 lands on the wireless charging station 130**.

In FIG. 1, a user 102 has experienced poor wireless connectivity issues when trying to access the internet via wireless network 150 using a client device. To remedy this problem, the user 102 accesses an application installed on the user's 102 user device 103 that is capable of communicating with the drone device 140 using the wireless network 150 (or some other communication channel such as a cellular network or short range radio). The user 103 may input data into the application installed on the user's 102 user device that includes a request for the drone device to (i) navigate to Room B and (ii) perform wireless diagnostics on the wireless network within Room B.

The user device 103 may transmit one or more instructions to the drone 140, based on the user's request. For instance, the one or more instructions may include an instruction to (i) navigate to Room B, and (ii) perform a wireless network diagnostic of the wireless network in Room B. In response, the drone 140 may depart from a wireless charging station 130, and navigate along a navigation path 132 to Room B. The drone 140 may autonomously navigate to Room B along a travel path 132 using a map of the property 101 stored in the drone's local memory. Alternatively, the user 102 may manually pilot the drone 140 using the user device 103. To facilitate manual flight, the drone 140 may use an onboard camera to stream a live video feed back to the user's 102 user device 103 via the network 150 or another network (e.g., a cellular network). In some implementations, the drone 140 may provide a live video feed back to the user's 102 user device 103 even when performing autonomous flight. Alternatively, or in addition, the user's 102 user device 102 may be configured to receive one or more video streams from one or more cameras **108*a*, 108*b*, 108*c*, 108*d*, 108*e* located throughout the property 101 that can be used to monitor the drone's 140** flight.

The example of system 101 includes a flying, quadcopter drone as the drone that navigates the property 101. However, the present disclosure need not be so limited. For instance, the system 101 may use in addition to, or in place of, the drone 140 one or more land-based drones that walk, roll, or the like on the ground.

The drone 140 may be equipped with a wireless network diagnostic device 142 that can be used to diagnose the wireless network 150. The wireless network diagnostic device 142 may include a combination of hardware and software tools can be used to analyze the performance of the wireless network 150 to determine if a wireless network problem exists. Analyzing the performance of the network 150 to determine if a wireless network problem exists may include evaluating wireless network connectivity to determine whether connectivity to the wireless network can be established a zone of the property such as a zone where the drone is located, evaluating the speed of the wireless network 150 by determining whether an upload speed of the wireless network or a download speed of the wireless network satisfies one or more predetermined thresholds, evaluating the number and type of devices currently connected to the wireless network 150, evaluating the amount of bandwidth consumed by each device that is currently connected to the wireless network 150 by determining whether the amount of bandwidth used by each device or each type of device that is currently connected to the network satisfies one or more predetermined threshold, evaluating the number of packet retries by determining whether a number of packet retries required by the drone while making test uploads or downloads across the wireless network satisfies a predetermined threshold, or the like. In some implementations, the drone 140 may also be equipped with an on-board wireless network repeater that is capable of boosting a detected wireless network signal in an effort to increase the strength of the wireless network signal, range of the wireless network signal, or the like.

In yet other implementations, the drone 140 may be equipped with a wireless frequency spectrum analyzer that can be used to analyze the performance of the wireless network 150 to determine if a wireless network problem exists. For example, the drone may use the wireless frequency spectrum analyzer to obtain data describing the level of saturation associated with at least a portion of the wireless spectrum (e.g., the 5 GHz band, the 2.4 GHZ band, or the like) in one or more zones of the property such as the zone where the drone currently is located. The drone may analyze the data obtained using the wireless frequency spectrum analyzer to determine a level of saturation of the wireless spectrum used by the wireless network the one or more zones. For example, the drone can determine how active transmitters in the spectrum are. This may include, for example, determining how much available bandwidth is available in the spectrum and how much of the spectrum is saturated. Based on the analysis of the data obtained using the wireless frequency, the drone may determine whether the level of saturation of the wireless spectrum for a portion of the wireless network one or more of the zones satisfies a predetermined threshold. In some implementations, for example, the drone may determine whether a predetermined percentage of the wireless spectrum's bandwidth is available for use by one or more devices.

In some implementations, analyzing the wireless network may include an analysis of the transmission of data by one or more devices connected to the network. For example, the drone may determine based on spectrum analysis that less than an available amount of bandwidth is available for use in a particular zone. In such instances, drone can analyze the use of data by devices connected to the network and identify devices that are sending information to devices remote from the property. In such instances, the drone 140 may determine that transmission of more than a threshold amount of data to a remote device may be indicative of a network hack that is causing congestion on the network.

The drone 140 arrives in the Room B. The drone 140 may move around to one or more different zones within Room B, and use its wireless network diagnostic device 142 to analyze the performance of the wireless network 150. For example, the drone 140 may navigate to zone A and analyze the performance of the wireless network 150 in zone A. The drone 140 may navigate to zone B and analyze the performance of the wireless network 150 in zone B. In this example, the drone 140 may detect a problem in the wireless network 150 in zone A. For example, the drone 140 may determine that wireless network connectivity in zone A is less reliable than wireless network connectivity in zone B because the wireless network 150 signal strength in zone A falls below a predetermined signal-strength threshold. As a result, the drone 140 may determine that the wireless network signal boost provided by wireless repeater 125*c* is not sufficient to provide a moderate or strong wireless network signal to zone A.

The drone 140 may detect the wireless network problem in zone A and take one or more actions to improve the performance of the wireless network in zone A. In some instances, the drone 140 can move one or more types of wireless network equipment into zone A, closer to zone A, or the like. For example, the drone 140 may navigate to wireless network repeater 125*c*, deploy an extendable arm that can engage the wireless repeater 125*c*, and move the wireless repeater 125*c* closer to zone A. Alternatively, or in addition, the drone 140 may navigate to a location that provides a supply of wireless network repeaters, deploy an extendable arm that can engage a wireless network repeater from the supply, navigate back to zone A, and the place the wireless network repeater in zone A. Alternatively, or in addition, the drone 140 may use a pointing instrument such as a light, a laser, an extendable arm, or the like to point to a location within Room B that would be an optimal location for positioning a wireless network repeater to boost the wireless network signal in zone A. The drone could then notify a user's 102 user device 103 with instructions for the user 102 to place a wireless network repeater at the location in Room B indicated by the drone's pointing instrument. Alternatively, the drone 140 may transmit a message to the user's 102 user device 103 that provides a summary of wireless network problem detected in zone A. The user 102 may receive the message and may take appropriate steps to remedy the wireless network problem in zone A.

In some implementations, the drone 140 may perform other actions after detecting a wireless network problem in one or more zones of a portion of a property. For example, the drone 140 may determine, based on data obtained from a spectrum analyzer that there is less than a threshold amount of bandwidth is available for a portion of the wireless network in a particular zone. In such instances, the drone 140 may generate and transmit one or more instructions to a wireless router or wireless repeater to adjust the wireless network parameters associated with the zone. For example, the drone 140 may instruct a wireless router to activate an additional network band. In one implementations, for example, the drone 140 may determine that more than a threshold amount of a 2.4 GHz band has become saturated in a particular zone, and then instruct a wireless router to activate a 5 GHz band. Alternatively, for example, the drone 140 may determine that less than a threshold amount of a 5 GHz band is available in a particular zone, and then instruct a wireless router to activate a second 5 GHz band. In yet another example, the drone 140 may determine that more than a threshold amount of bandwidth is available of a first 5 GHz band in a zone, and then instruct a wireless router to deactivate a second 5 GHz band that is currently activated in the zone.

In some implementations, in response to the detection of a network hack, the drone 140 may correct an overly congested wireless network by prohibiting one or more devices from accessing the wireless network 150. For example, if a camera is determined, by the drone 140, to be compromised by a network hack (or otherwise is determined to be using more than a threshold amount of bandwidth), the drone 140 can transmit one or more instructions to the camera, a wireless router, or both, that initiate removal of the camera from the wireless network 150. By prohibiting the camera from using the wireless network 150, available bandwidth will become available on wireless network 150. Such a solution may be used, by the drone 140, for any device determined to using more than a threshold amount of bandwidth and not just for devices that are compromised by a network hack. For example, a drone 140 may transmit one or more instructions to cut off network access to a smartphone (or any other device) that has exceeded a threshold amount of bandwidth usage.

In some implementations, prior to taking any of the corrective actions identified above, the drone 140 may use an onboard repeater to boost the wireless network signal strength of the zone where the wireless network problem was detected. The drone 140 may then re-evaluate the wireless network signal strength in the zone to determine if signal boost provided by the drone's onboard wireless repeater remedies the detected wireless network problem (e.g., if the wireless signal strength within the zone now satisfies a predetermine wireless signal strength threshold). In some implementations, the drone 140 may move around to multiple different locations within a zone with the onboard repeater running to evaluate the wireless signal strength of each different placement of the onboard repeater within the zone. If the drone determines that the drone's 140 onboard repeater was successful identifying an optimal placement of the drone's 140 onboard repeater within the zone that remedies the wireless network problem detected within the zone, then the drone 140 may take one or more of the corrective actions identified above (e.g., move a wireless network repeater to the optimal placement, point the optimal placement of a wireless network repeater within the zone, transmit a notification to the user of the optimal placement of a wireless network repeater within the zone, a combination thereof, or the like).

The example of FIG. 1 is an example that relies on a user 102 to instruct a drone 140 to deploy to perform wireless network diagnosis and correction. However, the present disclosure need not be so limited. Instead, other network components shown in FIG. 1 may be used to instruct the drone 140 to deploy to perform wireless network diagnosis and correction. For instance, a monitoring system control unit 110 may periodically monitor the output of one or more wireless network signal sensors placed throughout the property 101 and detect a problem in the sensor readings. For example, one or more wireless signal sensors may provide an output that is indicative of lack of a wireless network signal, a weak wireless network signal, or the like.

Alternatively, or in addition, the monitoring system control unit 110 may infer a wireless network problem based on the monitoring of one or more other sensors located throughout the property 101. For example, the monitoring system control unit 110 may periodically monitor the output of one or more sensors installed in the property 101 such as motion detectors, temperature sensors, cameras, or the like. In some instances, the monitoring system control unit 110 may lose the ability to communicate with the one or more sensors. Then, based on the inability to communicate with one or more sensors in a particular zone of the property 101, the monitoring system control unit 110 may infer the existence of a wireless network problem.

In some implementations, the monitoring application server 170 may transmit an instruction to the drone 140 (using the network 160 and one or more communications links 162) to deploy and perform wireless network diagnosis and correction in response to a detected wireless network problem (e.g., lack of wireless network signal strength detected by one or more sensors, poor wireless signal strength detected by one or more sensors, or the like). However, in some implementations, the monitoring application server 170 may instruct the drone 140 to perform wireless diagnosis and correction independent of one or more local sensors readings. For instance, the monitoring application server 10 may transmit an instruction to the drone 140 to perform wireless diagnosis and correction in response to a request from the user 102.

Alternatively, or in addition, the remote client device 180 may instruct the drone 140 to deploy and perform wireless network diagnosis and correction. For instance, one or more persons may be home in property 101, and call another person that is remote from property 101 to complain of apparent wireless network problems in property 101. In response, the person that is remote from property 101 may use the mobile device 180 to transmit an instruction to the drone 140 to deploy and perform wireless network diagnosis and correction.

Incoming requests for access to the drone 140 may be subject to authentication procedures. For example, a remote user of the user device 180 may need to input a username and password combination, answer security questions, input biometric data, or the like before the user device 180 is able to access and instruct the drone 140. Similar authentication may need to be performed on incoming requests to access the drone 140 that originate from the monitoring application server 170.

Figure 2A:
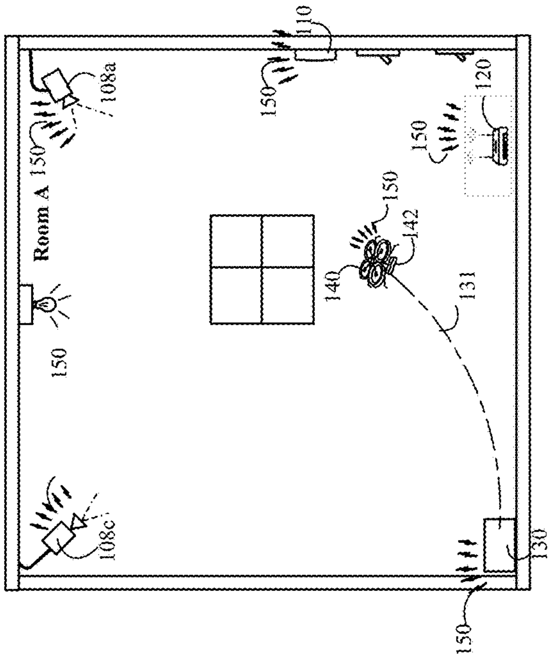
FIGS. 2A-2B provide contextual diagrams of an example of a system for deploying a drone to diagnose a wireless network.
Figure 2B:
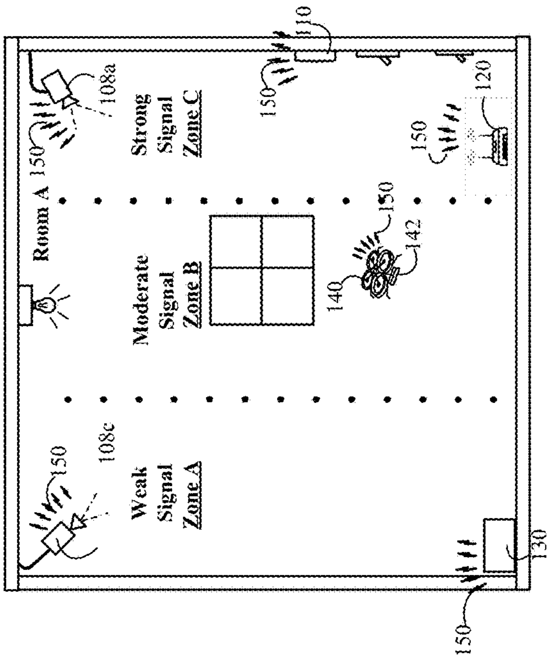

FIGS. 2A-2B provide contextual diagrams of an example of a system for deploying a drone 140 to diagnose a wireless network.

In FIG. 2A, the drone 140 may deploy on a navigation path 131 after receiving an instruction to deploy and perform a wireless diagnosis and correction. The stage of wireless diagnosis and correction performed by the drone 140 in FIG. 2A includes the drone 140 traveling to each of one or more zones of Room A and analyzing the performance of the wireless network within each respective zone. In some implementations, zones may be predefined to include, e.g., zones of predetermined size (e.g., x-feet high by x-feet wide by x-feet long). In other implementations, the drone 140 may dynamically identify natural boundaries between zones based on the changes in wireless network performance within a particular room of a property. Regardless of the method used to identify a zone, the drone 140 travels to each zone (or a particular zone), and then analyzes the wireless network performance of each zone.

By way of example, the drone 140 may analyze the wireless network performance of each respective zone A, B, and C. Analyzing the performance of the network in each of the respective zones may include evaluating wireless network connectivity, evaluating the speed of the wireless network, evaluating the number and type of devices currently connected to the network, evaluating the number of packet retries, or the like. In one implementation, the drone 140 may analyze the strength of the wireless network signal to determine whether the strength of the wireless network signal satisfies a predetermined threshold. Based on the analysis of zones, A, B, and C, the drone may determine that the zone A has a weak wireless network signal, the zone B has a moderate wireless network signal, and the zone C has a strong network signal. In response to determining that zone A is associated with a weak wireless network signal strength, drone 140 may take actions to correct the weak wireless signal strength identified in zone A. Different approaches for correcting the low wireless signal in stage A will be discussed with respect to FIGS. 2C-2D and FIG. 2E-2F below.

Figure 2C:
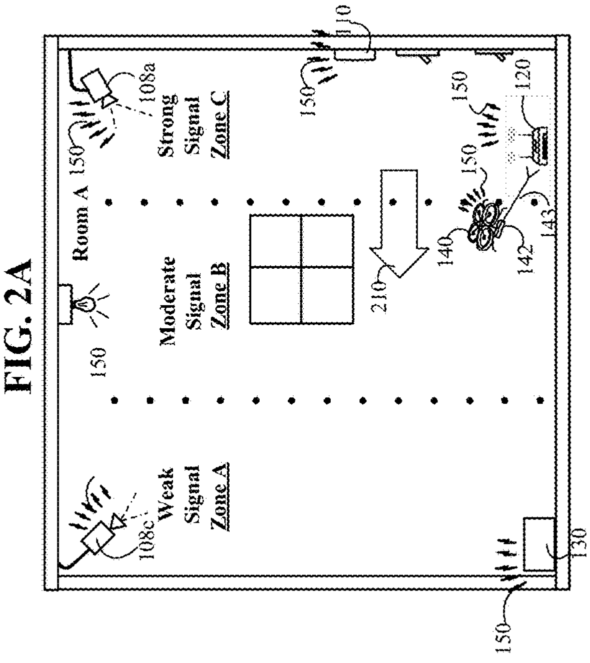
FIGS. 2C-2D provide contextual diagrams of an example of a drone correcting a problem in a wireless network.
Figure 2D:
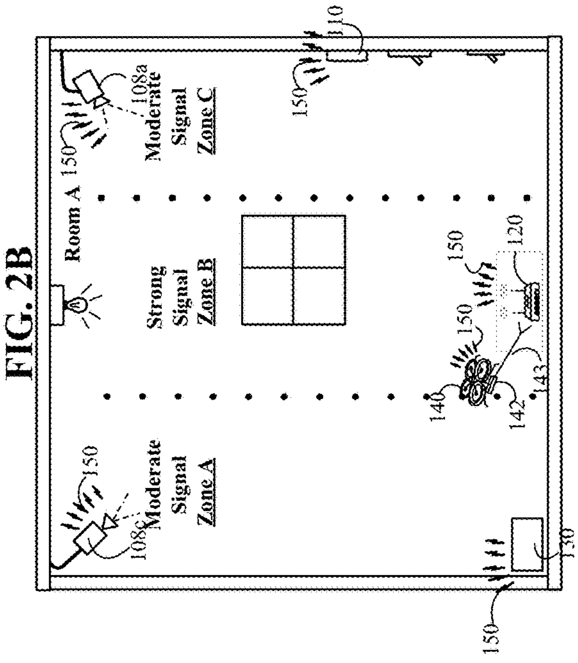

FIGS. 2C-2D provide contextual diagrams of an example of a drone 140 correcting a problem in a wireless network.

In FIG. 2C, the drone 140 can take measures to correct the weak wireless network signal detected in zone A. In this example, the drone 140 may detect the source of the wireless network signal that is being broadcast in Room A and attempt to reposition the source of the wireless network signal. For example, with reference to FIG. 2C, the drone 140 may identify the wireless network router 120 as being the source of the wireless network signal that is broadcast in Room A. The drone 140 may navigate to the wireless network router 120, deploy an extendible arm 143, and then move the wireless network router 120 along a path 210 to a location within Room A that results in a more evenly distributed wireless network signal.

For example, as shown in FIG. 2D, the drone 140 may reposition the wireless network router 120 at a central location of Room A. The result of the drone's 140 repositioning of the wireless network router 120 is zone B (e.g., an area of the Room A that is closest in proximity to the router 120) having a strong signal while each adjacent zones A and C each respectively have a moderate signal as they are each within the same predetermined distance of the wireless network router 120.

The drone 140 may include one or more onboard processors capable of determining a predetermined distance from the wireless network router 120 where the broadcast wireless network signals may be of sufficient strength to create a stable network connection. The drone 140 may strategically position the wireless network router 120 to ensure optimal access to the wireless network signals through Room A.

In some implementations, the drone 140 may perform other actions after detecting a wireless network problem in one or more zones of a portion of a property. For example, the drone 140 may generate a report that indicates that a wireless network problem exists in zone A of the Room A. The drone 140 may transmit the report to a user device 103. The report may include, for example, one or more instructions that trigger the generation of an alert notification on the user's 102 user device 103. The alert notification may include data that indicates the presence of a wireless network problem in zone A. In some implementations, the alert notification may include data identifying a location where a wireless router or wireless repeater may be placed in order to correct the wireless network problem. The user 102 may then take action to remedy the wireless network problem that exists in zone A by, for example, moving the wireless network router 120 closer to zone A, placing a wireless network repeater in zone A, or the like.

Once one or more steps have been taken to correct the wireless network problem, the drone 140 may return to the zone of the property (e.g., zone A) that was previously identified as being associated with a wireless network problem. The drone 140 may then analyze the wireless network performance in the zone to determine whether the corrective measures performed have sufficiently resolved the wireless network problem that was previously detected in the zone. For example, the drone 140 may determine whether the wireless signal strength in the zone satisfies a predetermined threshold. If the drone 140 determines that the wireless signal strength in the zone satisfies the predetermined threshold, the drone 140 may continue to analyze the wireless network performance in one or more other zones of the property or return to a wireless drone charging station 130 to charge the drone's 140 battery. Alternatively, if the drone 140 determines that the wireless signal strength in the zone does not satisfy the predetermined threshold, the drone 140 may perform one or more corrective measures to resolve the detected wireless network problem (e.g., move the wireless network router, notify a user device, or the like).

Figure 2E:
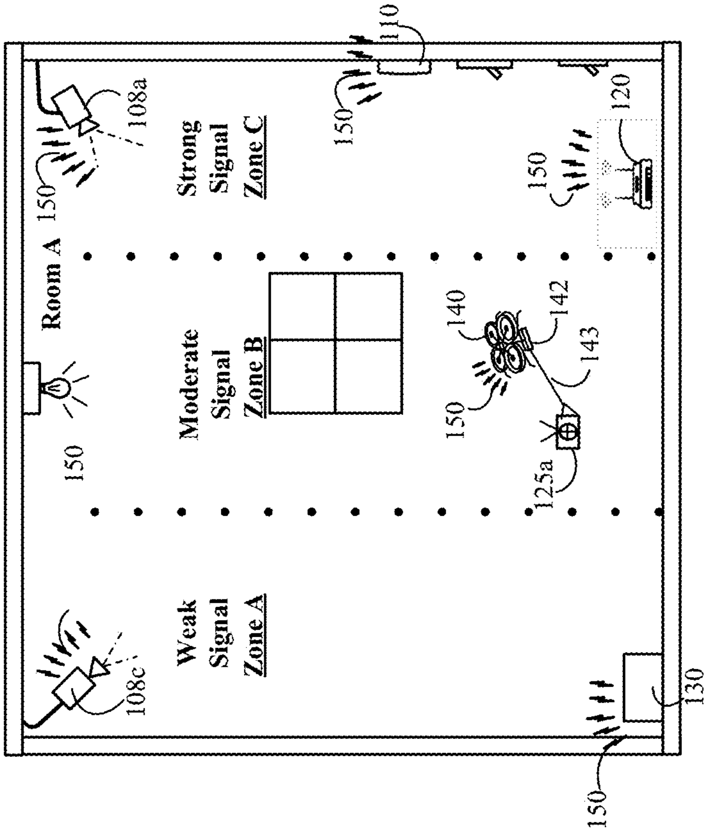
FIGS. 2E-2F provide contextual diagram of another example of a drone correcting a problem in a wireless network.
Figure 2F:
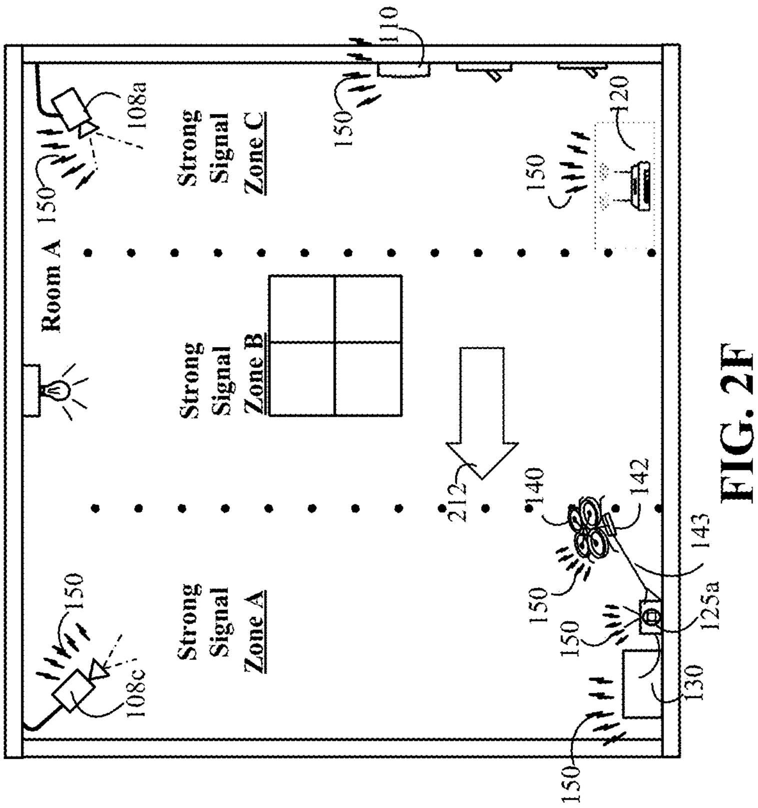

FIGS. 2E-2F provide contextual diagram of another example of a drone 140 correcting a problem in a wireless network.

The drone 140 may not be capable of relocating a wireless network router 120 to resolve detected problems in wireless network connections. For example, the wireless network router 120 may be physically connected to a cable line, Ethernet line, power cord, or the like. However, the drone 140 may strategically position other types of wireless network equipment to resolve a detected problem in a wireless network.

In FIG. 2E, the drone 140 may determine to correct the problem detected in Zone A by strategically placing a wireless network repeater 125*a* to boost the wireless network signal in zone A. In one implementation, the drone 140 may navigate to a wireless network repeater 125*a*, deploy an extendable arm 143, and engage the wireless network repeater 125*a*. The wireless network repeater 125*a* may include a wireless network repeater 125*a* that was already present in Room A. In some implementations, the drone 140 may navigate to a location within the property that includes a supply of multiple wireless network repeaters that can be used to resolve problems in the wireless network 150. The drone 140 may move the wireless network repeater 125*a* along a path 212 into zone A in an effort to boost the wireless network signal in Zone A.

For example, as shown in FIG. 2F, the drone 140 may strategically position the wireless network repeater 125*a* within zone A. The result of the drone's 140 strategic placement of the wireless network repeater 125*a* within zone A is that the wireless repeater enhances the weak signal that was previously existent in zone A and makes the wireless network signal in zone A stronger. In addition, the enhanced wireless network signal broadcast by repeater A now complements the wireless network signal broadcast by router 120. The result is that each zone of Room A has a strong wireless signal. The drone 140 may include one or more onboard processors capable of determining the best placement for the wireless network repeater 125*a*.

In some implementations, the drone 140 may perform other actions after detecting a wireless network problem in one or more zones of a portion of a property. For example, the drone 140 may generate a report that indicates that a wireless network problem exists in zone A of the Room A. The drone 140 may transmit the report to a user device 103. The report may include, for example, one or more instructions that trigger the generation of an alert notification on the user's 102 user device 103. The alert notification may include data that indicates the presence of a wireless network problem in zone A. The user 102 may then take action to remedy the wireless network problem that exists in zone A by, for example, moving a wireless network repeater 120 closer to zone A, placing a wireless network repeater 125*a* in zone A, or the like.

Once one or more steps have been taken to correct the wireless network problem, the drone 140 may return to the zone of the property (e.g., zone A) that was previously identified as being associated with a wireless network problem. The drone 140 may then analyze the wireless network performance in the zone to determine whether the corrective measures performed have sufficiently resolved the wireless network problem that was previously detected in the zone. For example, the drone 140 may determine whether the wireless signal strength in the zone satisfies a predetermined threshold. If the drone 140 determines that the wireless signal strength in the zone satisfies the predetermined threshold, the drone 140 may continue to analyze the wireless network performance in one or more other zones of the property or return to a wireless drone charging station 130 to charge the drone's 140 battery. Alternatively, if the drone 140 determines that the wireless signal strength in the zone does not satisfy the predetermined threshold, the drone 140 may perform one or more corrective measures to resolve the detected wireless network problem (e.g., move the wireless network router, notify a user device, or the like).

The examples of FIGS. 2C-2D and 2E-2F provide solutions that are generally permanent until the wireless network router, wireless network repeater, or both, fail, are moved, or the like. However, the drone 140 may be capable of providing less permanent solutions to problems detected in the wireless network 150. For example, the drone 140 may be equipped with a built-in wireless network repeater. In such instances, the drone 140 may navigate to one or more zones, and use the drone's 140 onboard repeater to boost the wireless network signal of the zone where the drone 140 resides. In such instances, when a user is located in a portion of the property where a problem in the wireless network exists, the user could summon the drone 140 using the user's user device, transmit an instruction to the drone 140 using the user's user device that initiates functionality of the drone's 140 wireless network repeater, and the user can access the wireless network that is enhanced by the drone's 140 wireless network repeater.

Figure 3:
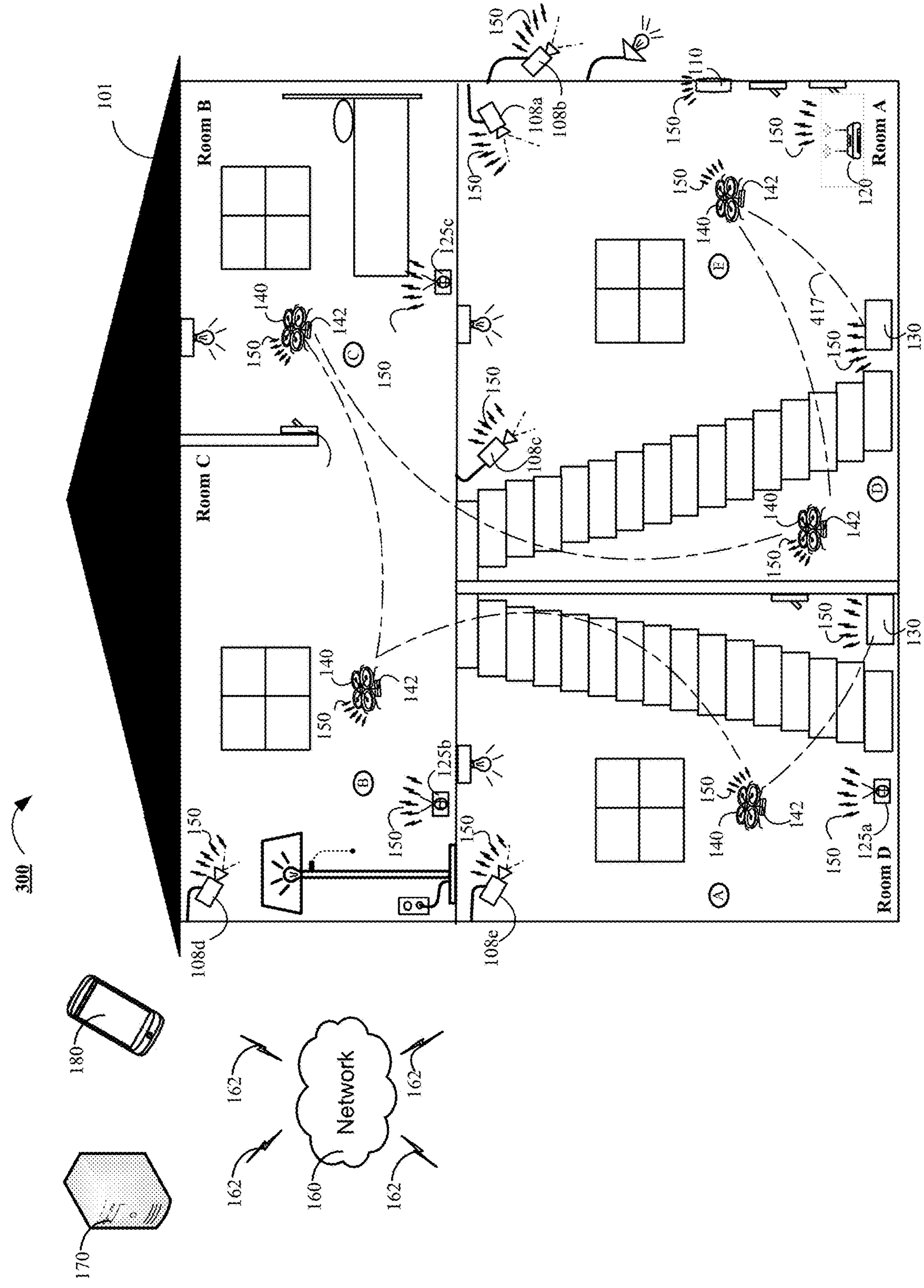
FIG. 3 is another example of a contextual diagram of a system for deploying a drone to diagnosis a wireless network.

FIG. 3 is another example of a contextual diagram of a system for deploying a drone to diagnosis a wireless network.

The examples above describe a single drone 140 navigating to one or more zones in a particular room of a property 101 in order to analyze the wireless network 150 performance in the one or more zones of the particular room. However, the present disclosure need not be so limited. For example, a drone 140 can be deployed as a diagnostic tool to analyze the performance of the wireless network in each zone of every room of a property 101 in order to maximize the effectiveness of the wireless network 150.

With reference to FIG. 3, a user 102 may possess a user device 103 that includes a mobile application that is configured to communicate with the drone 140 using the network 150 (or some other network such as a cellular network). The user 103 may input data into the mobile application installed on the user's 102 user device that includes a request for the drone device to navigate through the entire property 101 and analyze the performance of the wireless network 150 in each zone of each room in the property 101.

In response to the request from the user's device, the drone 140 may deploy from the wireless charging station 130*a* and proceed to analyze the performance of the wireless network each zone of every room in the property 101. For instance, the drone 140 may analyze every zone in Room D at stage A. The drone 140 may navigate to Room C and analyze the performance of the wireless network in each zone of Room C at stage B. The drone 140 may navigate to Room B and analyze the performance of the wireless network in each zone of Room B at stage C. The drone 140 may navigate to Room A and analyze the performance of the wireless network in each zone of Room A at stage E.

The drone 140 may generate a map such as a heat map for the entire property that provides an indication of the performance of the wireless network in each zone of the property 101. The drone 140, the user 102, or some other entity may then use the generated heat map to reconfigure the wireless network components used to broadcast the radio signals that create the wireless network 150. For instance, the drone 140 may navigate to, engage using an extendable arm, and reposition one or more wireless network repeaters 125*a*, 125*b*, 125*c*, the wireless router 120, or the like based on one or more problems identified in the generated heat map. The wireless network components may be repositioned as discussed with respect to FIGS. 2A-2E.

Though a local user 102 using a local device 103 initiated deployment of the drone 140 to perform wireless network performance analysis of each zone of each room of the entire property, the present disclosure need not be so limited. For instance, the local user 102 may initiate deployment of the drone 140 to each zone of less than all rooms, less than all zones of each room, or any combination of zones and rooms as necessary to analyze the performance of wireless network 150.

Similarly, the present disclosure is not limited to a local user 102 initiating deployment of the drone 140 to perform the wireless network performance and analysis described with respect to FIG. 3. Instead, the monitoring system control unit 110 may initiate the same drone deployment and wireless network analysis. For instance, the monitoring system control unit 110 may periodically (e.g., once a week, once a month, once a year, or the like) instruct a drone to navigate throughout the property to analyze the performance of the wireless network and optimize the performance of the wireless network.

Alternatively, or in addition, the monitoring application server 170 or a remote client device 180 may similarly initiate drone deployment and wireless network performance analysis remotely via the network 160 and one or more communications links 162. Incoming requests for access to the drone 140 may be subject to authentication procedures. For example, a remote user of the user device 180 may need to input a username and password combination, answer security questions, input biometric data, or the like before the user device 180 is able to access and instruct the drone 140. Similar authentication may need to be performed on incoming requests to access the drone 140 that originate from the monitoring application server 170.

In some implementations, the drone may perform one or more of the operations described with reference to FIG. 3 and determine that no wireless network problems exists. For example, the drone may receive an instruction to navigate to one or more zones of the property, analyze the wireless network performance in the one or more zones, but then determine that the wireless network performance is performing to expectations. The wireless network may be determined to be performing to expectations if each of set of wireless network characteristics are associated with a value that satisfies a predetermined performance thresholds. In such instances, the drone is capable of determining that the wireless network is performing to expectations and then generating a report that indicates that the current status of the wireless network in each of the one or more zones is satisfactory. In some implementations, even when the wireless network in one or more zones is determined to be satisfactory (e.g., each of one or more wireless network characteristics are determined to satisfy one or more thresholds for the particular wireless network characteristic), the drone may determine values associated with the one or more wireless network characteristics associated with the wireless network, and then generate a report that can be transmitted to a user device that summarizes the values associated with the one or more wireless network characteristics.

Figure 4:
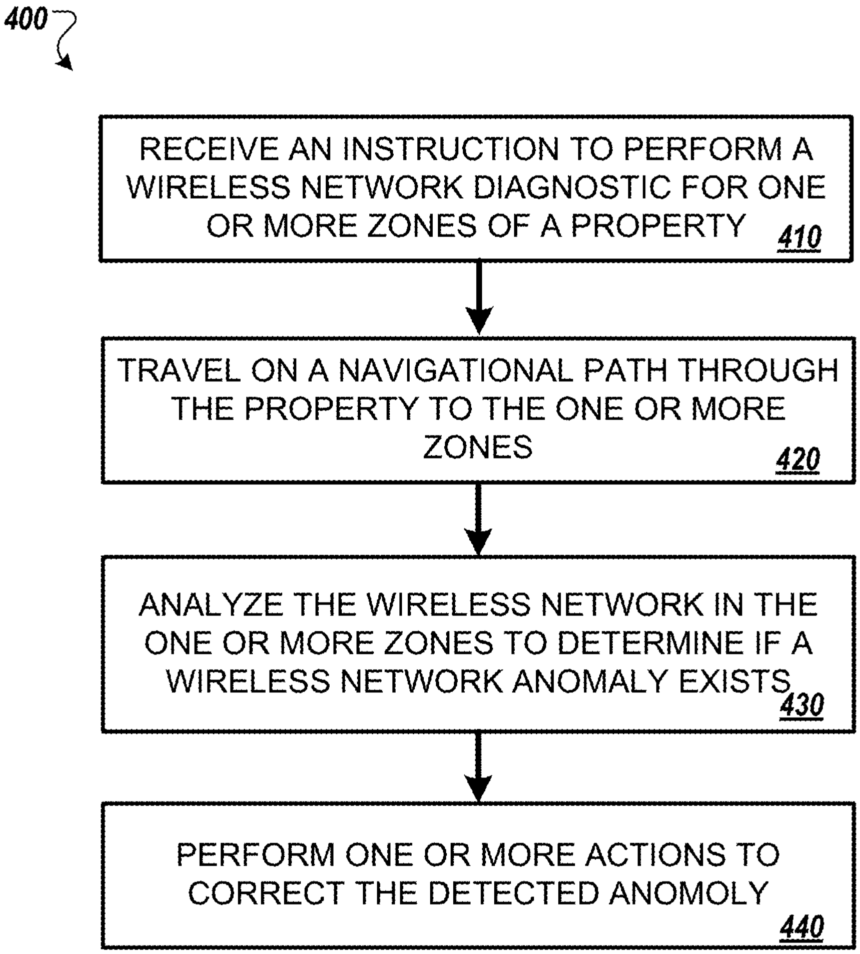
FIG. 4 is flowchart of an example of a process for using a drone to diagnose and correct a problem in a wireless network.

FIG. 4 is flowchart of an example of a process 400 for using a drone to diagnose and correct a problem in a wireless network. Generally, the process 400 includes receiving an instruction to perform a wireless network diagnostic for one or more zones of a property (410), traveling on a navigational path through the property to the one or more zones (420), analyzing the wireless network in the one or more zones to determine if a wireless network problem exists (430), and performing one or more actions to correct the detected problem (440).

In more detail, the process 400 begins at stage 410 by receiving an instruction to perform a wireless network diagnostic for one or more zones of a property. For example, a drone may receive an instruction from a user device that instructs the drone to deploy and analyze the performance of one or more zones of one or more rooms of a particular property. The user device may include a user device of an occupant of the property or a user device of a technician that is working on the wireless network. Alternatively, the drone may receive an instruction to deploy and analyze the performance of a wireless network in one or more zones of one or more rooms of a property from a monitoring system control unit, a remote monitoring application server, a remote user device, or the like. Alternatively, the instruction may be received from a memory device of the drone based on the determination that it is currently time for a scheduled evaluation of the wireless network. For example, the drone may store a schedule of one or more dates and times when the drone is supposed to navigate the property and evaluate the wireless network. In such instances, upon detection that a current time satisfies the scheduled time, the drone may receive and process an instruction to analyze the wireless network from a wireless network evaluation scheduling application, receive and process an instruction to analyze the wireless network that is stored in a memory device of the drone, receive and process an instruction to analyze the wireless network from a cloud server that communicates with the drone, or a combination thereof.

In one or more of the aforementioned implementations, the instruction to analyze the wireless network may be associated with a time delay period. In such instances, the drone may receive an instruction to analyze a wireless network that is triggered and then received in response to a determination, by the drone, that the time delay period has expired.

In response to processing an instruction to perform a wireless network diagnostic from one or more zones of a property, the drone may travel 420 on a navigational path to the one or more zones. In some implementations, the drone may navigate to one or more particular zones in one or more particular rooms of the property. Alternatively, the drone may navigate to each zone of each room of the property. The scope of the drone's navigation throughout the property and the extent of the drone's analysis will be based on the instruction received by the drone at stage 410. For instance, the incoming instruction may specify the extent to which the drone is supposed to travel through the property and analyze the performance of the network (e.g., every zone, every room, a subset of zones, a subset of rooms, or the like).

In some implementations, the drone may travel on a navigation path to the one or more zones that begins in the property and ends in the property. For example, a legitimate occupant of the property may use a user device to instruct the drone to navigation from a current location such as a charging station to a particular zone of the property. However, the present disclosure need not be so limited. For example, in some implementations, the drone may belong to a third party service provider such as an internet service provider, wireless network technician, or the like. In such instances, the drone may be at a location that is remote from the property such as at a location owned, operated, leased, or the like by the third party service provider such as an internet service provider, wireless network technician services, or the like In such instances, the a third party such as an internet service provider, wireless network technician, or the like may instruct the drone to navigate from the location that is remote from the property to the property, to a particular zone of the property, or the like. In such implementations, the drone may be configured to navigate from the remote location to the property, and then await approval from a legitimate occupant of the property for the drone to enter the property and continue navigation to the one or more zones to diagnose the wireless network of the zone.

The drone may analyze 430 the wireless network in the one or more zones to determine if a wireless network problem exists. Analyzing the performance of the wireless network to determine if a wireless network problem exists may include evaluating wireless network connectivity to determine whether connectivity to the wireless network can be established in a zone of the property such as a zone where the drone is located, evaluating the speed of the wireless network by determining whether an upload speed of the wireless network or a download speed of the wireless network satisfies one or more predetermined thresholds, evaluating the number and type of devices currently connected to the wireless network, evaluating the amount of bandwidth consumed by each device that is currently connected to the wireless network by determining whether the amount of bandwidth used by each device or each type of device that is currently connected to the network satisfies one or more predetermined threshold, evaluating the number of packet retries by determining whether a number of packet retries required by the drone while making test uploads or downloads across the wireless network satisfies a predetermined threshold, or the like. Such analysis may be performed on a zone-by-zone basis, based on instructions received from the local user device, monitoring system control unit, remote monitoring application server, remote user device, or the like.

In some implementations, analyzing the wireless signal strength may include the drone using an onboard repeater to boost the wireless network signal strength of the zone where the wireless network problem was detected. The drone may then re-evaluate the wireless network signal strength in the zone to determine if the signal boost provided by the drone's onboard wireless repeater remedies the detected wireless network problem (e.g., if the wireless signal strength within the zone now satisfies a predetermine wireless signal strength threshold after the wireless signal strength is boosted by the drone's onboard repeater). In some implementations, analyzing the wireless signal strength may include the drone moving around to multiple different locations within a zone with the onboard repeater running to evaluate the wireless signal strength of each different placement of the onboard repeater within the zone.

In some implementations, the drone may be equipped with a wireless frequency spectrum analyzer that can be used to analyze the performance of the wireless network. In such implementations, analyzing performance of the wireless network may include the drone using the wireless frequency spectrum analyzer to obtain data describing the level of saturation associated with at least a portion of the wireless spectrum (e.g., the 5 GHz band, the 2.4 GHZ band, or the like) in one or more zones of the property such as the zone where the drone currently is located. The drone may analyze the data obtained using the wireless frequency spectrum analyzer to determine a level of saturation of the wireless spectrum used by the wireless network the one or more zones. For example, the drone can determine how active transmitters in the spectrum are. This may include, for example, determining how much available bandwidth is available in the spectrum and how much of the spectrum is saturated. Based on the analysis of the data obtained using the wireless frequency, the drone may determine whether the level of saturation of the wireless spectrum for a portion of the wireless network one or more of the zones satisfies a predetermined threshold. In some implementations, for example, the drone may determine whether a predetermined percentage of the wireless spectrum's bandwidth is available for use by one or more devices.

In response to the detection of a wireless network problem (e.g., because the wireless network signal strength does not exceed a predetermined threshold) within a particular zone, the drone may perform 440 one or more actions to correct the detected problem. For example, the one or more drones may be able to move a wireless network repeater into the zone associated with the problem in an effort to boost the wireless network signal strength in the zone associated with the problem. Alternatively, the drone may use a pointing device such as a light, laser, deployable arm, or the like to point to the place in the room where a repeater could be placed in order to boost the wireless signal for the room.

In some implementations, prior to taking such corrective actions, the drone may evaluate the practicality of the corrective action. For example, the drone may determine that placing wireless repeater in the middle of the room on the floor resolves the wireless network problem. However, the drone may determine that a corrective action that requires placing a repeater on the floor in the middle of the room is not practical because people may trip over the repeater. In response to determining that a determined corrective action is not practicable, the drone may continue to analyze the wireless network, and determine an alternative corrective action.

Alternatively, or in addition, one or more drones may be equipped with a wireless routing components (e.g., a repeater) that can be used to temporarily boost wireless signal strength in the vicinity of the drones. For example, the drone may navigate to the zone associated with the problem, activate the drone's wireless network repeater, and boost the wireless network signal associated with the zone. Alternatively, or in addition, the one or more drone may generate a wireless network status report that is transmitted to a user who can take actions to correct the detected problem. In some implementations, the drone may be configured to generate and transmit instructions to one or more wireless repeaters or one or more wireless routers that instruct one or more of the wireless repeaters or wireless routers to adjust one or more wireless repeater or wireless router settings, respectively. For example, the drone may instruct a wireless router to activate or deactivate a spectrum band (e.g., activate or deactivate a 5 GHz, activate or deactivate a 2.4 GHz band, or the like).

Figure 5:
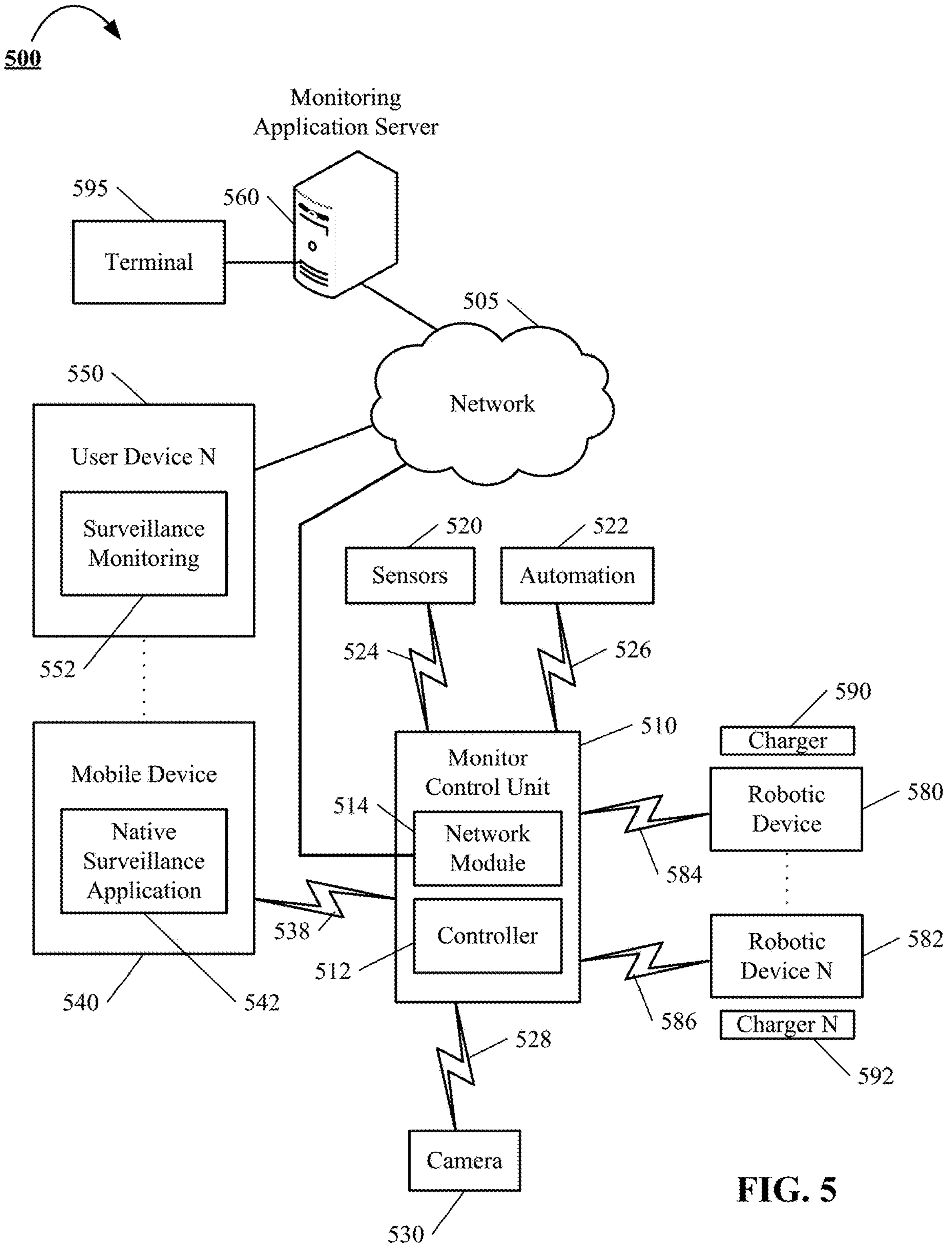
FIG. 5 is a block diagram of a monitoring system that employs drones.

FIG. 5 is a block diagram of a monitoring system that employs drones.

The electronic system 500 includes a network 505, a monitoring system control unit 510, one or more user devices 540, 550, and a monitoring application server 560. In some examples, the network 505 facilitates communications between the monitoring system control unit 510, the one or more user devices 540, 550, and the monitoring application server 560.

The network 505 is configured to enable exchange of electronic communications between devices connected to the network 505. For example, the network 505 may be configured to enable exchange of electronic communications between the monitoring system control unit 510, the one or more user devices 540, 550, and the monitoring application server 560. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VOIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitoring system control unit 510. In some examples, the controller 512 may include a processor or other control circuitry configured to execute instructions of a program that controls operation of an alarm system. In these examples, the controller 512 may be configured to receive input from sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring system control unit 510 to communicate over a local area network and/or the Internet. The network module 514 also may be a voiceband modem configured to enable the alarm panel to communicate over the telephone lines of Plain Old Telephone Systems (POTS).

The monitoring system that includes the monitoring system control unit 510 includes one or more sensors or detectors. For example, the monitoring system may include multiple sensors 520. The sensors 520 may include a wireless network sensor, contact sensor, a motion sensor, a glass break sensor, or any other type of sensor included in an alarm system or security system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The monitoring system control unit 510 communicates with the module 522 and the camera 530 to perform surveillance or monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the monitoring system control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building monitored by the monitoring system control unit 510. The camera 530 may be configured to capture single, static images of the area and also video images of the area in which multiple images of the area are captured at a relatively high frequency (e.g., thirty images per second). The camera 530 may be controlled based on commands received from the monitoring system control unit 510.

The camera 530 may be triggered by several different types of techniques. For instance, a Passive Infra Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the monitoring control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the monitoring system control unit 510 and the camera 530 receives commands related to operation from the monitoring application server 560.

The system 500 further includes one or more robotic devices 580 and 582. The robotic devices are capable of moving and taking actions to assist with analyzing the performance of one or more wireless communications links such as communications links 524, 526, 528, 538, 584, 586. The wireless communication links may include, for example, a local Wi-Fi network, and other wireless networks, as described below. The robotic devices 580 and 582 may be equipped with a combination of hardware and software that can be used to run diagnostic tests on one or more of the wireless communications links 524, 526, 528, 538, 584, 586. The combination and hardware and software that can be used to run diagnostic tests on the one or more of the wireless communications links 524, 526, 528, 538, 584, 586 can be employed by the robotic devices 580 and 582 to detect problems in the wireless communications links 524, 526, 528, 538, 584, 586.

The one or more robotic devices 580 and 582 may also be equipped to correct problems detected in the network. For instance, the robotic devices 580 and 582 may be equipped with an extendible appendage which can be deployed and used to engage one or more network components used to generate the wireless communications links. Once the robotic devices 580 and 582 engages as network component, the robotic devices 580 and 582 may move the network component within a predetermined vicinity of the detected problem in order to boost the communication links' signal. The robotic devices 580 and 582 may be equipped with a wireless network repeater that can be used to boost the wireless signal of a communication link associated with a detected problem.

The robotic devices 580 and 582 may be any type of robots that are capable of moving and taking actions throughout a property. For example, the robotic devices 580 and 582 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 580 and 582 may be robotic devices that are intended for other purposes and merely associated with the monitoring system 500 for use in appropriate circumstances. For instance, a robotic vacuum cleaner device may be associated with the monitoring system 500 as one of the robotic devices 580 and 582 and may be controlled to take action responsive to monitoring system events.

In some examples, the robotic devices 580 and 582 automatically navigate within a property. In these examples, the robotic devices 580 and 582 include sensors and control processors that guide movement of the robotic devices 580 and 582 within the property. For instance, the robotic devices 580 and 582 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 580 and 582 may include control processors that process output from the various sensors and control the robotic devices 580 and 582 to move along a path that reaches the desired destination and avoids obstacles. In this regard, the control processors detect walls or other obstacles in the property and guide movement of the robotic devices 580 and 582 in a manner that avoids the walls and other obstacles.

In addition, the robotic devices 580 and 582 may store data that describes attributes of the property. For instance, the robotic devices 580 and 582 may store a floorplan and/or a three-dimensional model of the property that enables the robotic devices 580 and 582 to navigate the property. During initial configuration, the robotic devices 580 and 582 may receive the data describing attributes of the property, determine a frame of reference to the data (e.g., a home or reference location in the property), and navigate the property based on the frame of reference and the data describing attributes of the property. Further, initial configuration of the robotic devices 580 and 582 also may include learning of one or more navigation patterns in which a user provides input to control the robotic devices 580 and 582 to perform a specific navigation action (e.g., fly to an upstairs bedroom and spin around while capturing video and then return to a home charging base). In this regard, the robotic devices 580 and 582 may learn and store the navigation patterns such that the robotic devices 580 and 582 may automatically repeat the specific navigation actions upon a later request.

In some implementations, the robotic devices 580 and 582 may include output devices. In these implementations, the robotic devices 580 and 582 may include one or more displays, one or more speakers, one or more projectors, and/or any type of output devices that allow the robotic devices 580 and 582 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 580 and 582 also may include a communication module that enables the robotic devices 580 and 582 to communicate with the monitoring system control unit 510, each other, and/or other devices. The communication module may be a wireless communication module that allows the robotic devices 580 and 582 to communicate wirelessly. For instance, the communication module may be a Wi-Fi module that enables the robotic devices 580 and 582 to communicate over a local wireless network at the property. The communication module further may be a 900 MHz wireless communication module that enables the robotic devices 580 and 582 to communicate directly with the monitoring system control unit 510. Other types of short-range wireless communication protocols, such as Bluetooth, Bluetooth LE, Z-Wave, ZigBee, etc., may be used to allow the robotic devices 580 and 582 to communicate with other devices in the property.

The robotic devices 580 and 582 further may include processor and storage capabilities. The robotic devices 580 and 582 may include any suitable processing devices that enable the robotic devices 580 and 582 to operate applications and perform the actions described throughout this disclosure. In addition, the robotic devices 580 and 582 may include solid state electronic storage that enables the robotic devices 580 and 582 to store applications, configuration data, collected sensor data, and/or any other type of information available to the robotic devices 580 and 582.

The robotic devices 580 and 582 are associated with one or more charging stations 590 and 592. The charging stations 590 and 592 may be located at predefined home base or reference locations in the property. The robotic devices 580 and 582 may be configured to navigate to the charging stations 590 and 592 after completion of tasks needed to be performed for the monitoring system 500. For instance, after completion of a monitoring operation or upon instruction by the monitoring system control unit 510, the robotic devices 580 and 582 may be configured to automatically fly to and land on one of the charging stations 590 and 592. In this regard, the robotic devices 580 and 582 may automatically maintain a fully charged battery in a state in which the robotic devices 580 and 582 are ready for use by the monitoring system 500.

The charging stations 590 and 592 may be contact based charging stations and/or wireless charging stations. For contact based charging stations, the robotic devices 580 and 582 may have readily accessible points of contact that the robotic devices 580 and 582 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 580 and 582 may charge through a wireless exchange of power. In these cases, the robotic devices 580 and 582 need only locate themselves closely enough to the wireless charging stations for the wireless exchange of power to occur. In this regard, the positioning needed to land at a predefined home base or reference location in the property may be less precise than with a contact based charging station. Based on the robotic devices 580 and 582 landing at a wireless charging station, the wireless charging station outputs a wireless signal that the robotic devices 580 and 582 receive and convert to a power signal that charges a battery maintained on the robotic devices 580 and 582.

In some implementations, each of the robotic devices 580 and 582 has a corresponding and assigned charging station 590 and 592 such that the number of robotic devices 580 and 582 equals the number of charging stations 590 and 592. In these implementations, the robotic devices 580 and 582 always navigate to the specific charging station assigned to that robotic device. For instance, the robotic device 580 may always use changing station 590 and the robotic device 582 may always use changing station 592.

In some examples, the robotic devices 580 and 582 may share charging stations. For instance, the robotic devices 580 and 582 may use one or more community charging stations that are capable of charging multiple robotic devices 580 and 582. The community charging station may be configured to charge multiple robotic devices 580 and 582 in parallel. The community charging station may be configured to charge multiple robotic devices 580 and 582 in serial such that the multiple robotic devices 580 and 582 take turns charging and, when fully charged, return to a predefined home base or reference location in the property that is not associated with a charger. The number of community charging stations may be less than the number of robotic devices 580 and 582.

Also, the charging stations 590 and 592 may not be assigned to specific robotic devices 580 and 582 and may be capable of charging any of the robotic devices 580 and 582. In this regard, the robotic devices 580 and 582 may use any suitable, unoccupied charging station when not in use. For instance, when one of the robotic devices 580 and 582 has completed an operation or is in need of battery charge, the monitoring system control unit 510 references a stored table of the occupancy status of each charging station and instructs the robotic device to navigate to the nearest charging station that is unoccupied.

The communication links 524, 526, 528, 532, 584, and 586 may include a local network. The sensors 520, the module 522, the camera 530, the thermostat 534, and the robotic devices 580 and 582 and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the monitoring system control unit 510, the one or more user devices 540, 550, and the central alarm station server 570 over the network 505. For example, the monitoring application server 560 may be configured to monitor events (e.g., alarm events) generated by the monitoring system control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540, 550.

The one or more user devices 540, 550 are devices that host and display user interfaces. For instance, the user device 540 is a mobile device that hosts one or more native applications (e.g., robotic device interface application 542, 552). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a robotic device interface application 542, 552. The robotic device interface application 542, 552 refers to a software/firmware program running on the corresponding mobile device that enables the user interface and features for communicating with a robotic device 580, 582. The user device 540 may load or install the robotic device interface application 542, 552 based on data received over a network or data received from local media. The robotic device interface application 542, 552 runs on mobile devices platforms, such as iPhone, iPod touch, Blackberry, Google Android, Windows Mobile, etc. The robotic device interface application 542, 552 may provide facilitate communication with the one or more robotic devices 580, 582 using one or more communication links 524, 526, 528, 538, 584, 586.

In other implementations, the system 500 further includes network 505 and the sensors 520, the module 522, the camera 530, and the robotic devices 580 and 582 are configured to communicate sensor and image data to the one or more user devices 540, 550 over network 505 (e.g., the Internet, cellular network, etc.). In yet another implementation, the sensors 520, the module 522, the camera 530, and the robotic devices 580 and 582 (or a component, such as a bridge/router) are intelligent enough to change the communication pathway from a direct local pathway when the one or more user devices 540, 550 are in close physical proximity to the sensors 520, the module 522, the camera 530, and the robotic devices 580 and 582 to a pathway over network 505 when the one or more user devices 540, 550 are farther from the sensors 520, the module 522, the camera 530, and the robotic devices 580 and 582. In some examples, the system leverages GPS information from the one or more user devices 540, 550 to determine whether the one or more user devices 540, 550 are close enough to the sensors 520, the module 522, the camera 530, and the robotic devices 580 and 582 to use the direct local pathway or whether the one or more user devices 540, 550 are far enough from the sensors 520, the module 522, the camera 530, and the robotic devices 580 and 582 that the pathway over network 505 is required. In other examples, the system leverages status communications (e.g., pinging) between the one or more user devices 540, 550 and the sensors 520, the module 522, the camera 530, and the robotic devices 580 and 582 to determine whether communication using the direct local pathway is possible. If communication using the direct local pathway is possible, the one or more user devices 540, 550 communicate with the sensors 520, the module 522, the camera 530, and the robotic devices 580 and 582 using the direct local pathway. If communication using the direct local pathway is not possible, the one or more user devices 540, 550 communicate with the sensors 520, the module 522, the camera 530, and the robotic devices 580 and 582 using the pathway over network 505.

In some implementations, the system 500 provides end users with access to images captured by the camera 530 to aid in decision making. The system 500 may transmit the images captured by the camera 530 over a wireless WAN network to the user devices 540, 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The invention claimed is:

1. A method comprising:

detecting, by a first computer device at a property, that a second device is not connected to a wireless network at the property; and in response to detecting that the second device is not connected to the wireless network at the property:

detecting, by the first computer device and using data from one or more first sensors in the first computer device, a wireless network problem for one or more other devices and the wireless network at the property;

detecting, by the first computer device and using one or more second sensors in the first computer device, one or more wireless signal strength measurements at the property;

determining whether the one or more wireless signal strength measurements satisfy a signal strength threshold; and in response to determining that the one or more wireless signal strength measurements satisfy the signal strength threshold and detecting the wireless network problem for the one or more other devices and the wireless network, sending, to a wireless router for the property, an instruction to cause the wireless router to activate a network band.

2. The method of claim 1, comprising:

determining, for a wireless transmitter, whether an activity level of the wireless transmitter satisfies an activity threshold, wherein:

sending the instruction to cause the wireless router to activate the network band is responsive to determining that the activity level of the wireless transmitter satisfies the activity threshold.

3. The method of claim 1, comprising:

generating, using second data that indicates the wireless network problem for the one or more other devices and the one or more wireless signal strength measurements, a heat map that indicates, for a zone at the property, a corresponding wireless network performance for the zone, wherein sending the instruction to cause the wireless router to activate the network band uses the heat map.

4. The method of claim 1, comprising:

determining whether an amount of data transmitted by a third device satisfies a second threshold; and in response to determining that the amount of data transmitted by the third device satisfies the second threshold, determining that there is likely a network hack, wherein sending the instruction is responsive to determining that there is likely a network hack.

5. The method of claim 1, wherein the second device comprises a wireless camera.

6. The method of claim 1, wherein the first computer device comprises a robot.

7. A system comprising one or more computers and one or more storage devices on which are stored instructions that are operable, when executed by the one or more computers, to cause the one or more computers to perform operations comprising:

detecting, by the system at a property, that a second device is not connected to a wireless network at the property; and in response to detecting that the second device is not connected to the wireless network at the property:

detecting, by the system and using data from one or more first sensors in the system, a wireless network problem for one or more other devices and the wireless network at the property;

detecting, by the system and using one or more second sensors in the system, one or more wireless signal strength measurements at the property;

determining whether the one or more wireless signal strength measurements satisfy a signal strength threshold; and in response to determining that the one or more wireless signal strength measurements satisfy the signal strength threshold and detecting the wireless network problem for the one or more other devices and the wireless network, sending, to a wireless router for the property, an instruction to cause the wireless router to activate a network band.

8. The system of claim 7, the operations comprising:

determining, for a wireless transmitter, whether an activity level of the wireless transmitter satisfies an activity threshold, wherein:

sending the instruction to cause the wireless router to activate the network band is responsive to determining that the activity level of the wireless transmitter satisfies the activity threshold.

9. The system of claim 7, the operations comprising:

generating, using second data that indicates the wireless network problem for the one or more other devices and the one or more wireless signal strength measurements, a heat map that indicates, for a zone at the property, a corresponding wireless network performance for the zone, wherein sending the instruction to cause the wireless router to activate the network band uses the heat map.

10. The system of claim 7, the operations comprising:

determining whether an amount of data transmitted by a third device satisfies a second threshold; and in response to determining that the amount of data transmitted by the third device satisfies the second threshold, determining that there is likely a network hack, wherein sending the instruction is responsive to determining that there is likely a network hack.

11. The system of claim 7, wherein the second device comprises a wireless camera.

12. The system of claim 7, wherein the system comprises a robot.

13. One or more non-transitory computer storage media encoded with instructions that, when executed by a system implemented on one or more computers, cause the one or more computers to perform operations comprising:

detecting, by the system, that a second device is not connected to a wireless network at a property; and in response to detecting that the second device is not connected to the wireless network at the property:

detecting, by the system and using data from one or more first sensors coupled to the system, a wireless network problem for one or more other devices and the wireless network at the property;

detecting, by the system and using one or more second sensors coupled to the system, one or more wireless signal strength measurements at the property;

determining whether the one or more wireless signal strength measurements satisfy a signal strength threshold; and in response to determining that the one or more wireless signal strength measurements satisfy the signal strength threshold and detecting the wireless network problem for the one or more other devices and the wireless network, sending, to a wireless router for the property, an instruction to cause the wireless router to activate a network band.

14. The computer storage media of claim 13, the operations comprising:

determining, for a wireless transmitter, whether an activity level of the wireless transmitter satisfies an activity threshold, wherein:

sending the instruction to cause the wireless router to activate the network band is responsive to determining that the activity level of the wireless transmitter satisfies the activity threshold.

15. The computer storage media of claim 13, the operations comprising:

generating, using second data that indicates the wireless network problem for the one or more other devices and the one or more wireless signal strength measurements, a heat map that indicates, for a zone at the property, a corresponding wireless network performance for the zone, wherein sending the instruction to cause the wireless router to activate the network band uses the heat map.

16. The computer storage media of claim 13, the operations comprising:

determining whether an amount of data transmitted by a third device satisfies a second threshold; and in response to determining that the amount of data transmitted by the third device satisfies the second threshold, determining that there is likely a network hack, wherein sending the instruction is responsive to determining that there is likely a network hack.

17. The computer storage media of claim 13, wherein the second device comprises a wireless camera.

18. The computer storage media of claim 13, wherein the system comprises a robot.

* * * * *